United States Patent [19]

Schack et al.

[11] Patent Number: 5,553,985

[45] Date of Patent: Sep. 10, 1996

[54] QUICK CLEAN-UP DUAL PISTON PUMP

[75] Inventors: Warren R. Schack, Austin, Tex.; Wendell Dennis, Overland Park, Kans.

[73] Assignee: Marlen Research Corporation, Overland Park, Kans.

[21] Appl. No.: 293,501

[22] Filed: Aug. 19, 1994

[51] Int. Cl.[6] .................................................. B65G 65/46
[52] U.S. Cl. .......................... 414/287; 414/288; 414/326; 366/185; 366/195; 222/413; 198/861.6; 198/533; 198/535; 198/538; 99/348; 99/443 R
[58] Field of Search ....................... 99/348, 443 R, 99/443 C; 222/413, 410, 411, 412; 414/287, 786, 288, 326, 197, 175, 325, 218, 158; 366/41, 50, 54, 76.7, 76.9, 185, 93–95, 158.3, 194, 318, 199, 192, 200, 202, 195, 203, 220, 219, 232, 233, 237, 240; 198/861.5, 861.6, 533, 535, 861.4, 538, 545, 548, 550.2, 550.6

[56] References Cited

U.S. PATENT DOCUMENTS

| | | | |
|---|---|---|---|
| 2,851,257 | 9/1958 | Morgan | 366/195 |
| 2,923,574 | 2/1960 | Fuss | 222/413 X |
| 3,307,748 | 3/1967 | Dunn, Jr. | 222/413 X |
| 4,157,769 | 6/1979 | Radel | 414/287 X |
| 4,693,611 | 9/1987 | Verkler | 222/413 X |
| 4,708,489 | 11/1987 | Carlson | 366/195 X |
| 5,411,329 | 5/1995 | Perry | 366/185 X |

FOREIGN PATENT DOCUMENTS

| | | | |
|---|---|---|---|
| 1472523 | 1/1967 | France | 414/288 |
| 57433 | 3/1988 | Japan | 414/326 |
| 2202211 | 9/1988 | United Kingdom | 222/413 |

*Primary Examiner*—Frank E. Werner
*Attorney, Agent, or Firm*—Hovey, Williams, Timmons & Collins

[57] ABSTRACT

A dual-piston pump or similar material handling device includes a hopper assembly for storing material that is to be delivered to the device, and a transfer assembly between the hopper assembly and the frame of the device. The hopper assembly is supported for pivotal movement about a horizontal axis between a use position and a cleaning position, and the transfer assembly is supported for axial movement along a vertical axis and for pivotal movement about the axis so that it too may be moved to a cleaning position exposing the material handling device for cleaning.

11 Claims, 3 Drawing Sheets

QUICK CLEAN-UP DUAL PISTON PUMP

BACKGROUND OF THE INVENTION

1. Field of the Invention

The present invention relates generally to material handling equipment and, more particularly, to a dual-piston pump or the like having hopper and transfer assemblies that are movable from the use position to a cleaning position to facilitate clean-up of the pump.

2. Discussion of the Prior Art

Food processors often make use of large-pumps for pumping and/or portioning of comestible products such as meat or vegetables. One class of food pump of this character which has achieved substantial commercial success is the twin piston food pumps commercialized by Marlen Research Corporation of Overland Park, Kans. Exemplary pumps of this type are illustrated in U.S. Pat. No. 4,869,653 which is incorporated by reference herein.

Piston-type pumps normally include a hopper in which the comestible product is stored prior to being fed to the pump. Such hoppers are spaced above the pump and communicate with a pump chamber via a transfer assembly supported on the frame of the pump between the pump chamber and the hopper. An auger or other similar conveyance mechanism is supported within the transfer assembly, and operates to move the product from the hopper to the pump chamber under a positive force.

While conventional hopper and transfer assembly constructions provide excellent operational characteristics, they can be difficult and time consuming to clean and repair. As can be appreciated, food processors must periodically clean all food-contacting portions of their pumping systems, which necessitates that the interior of the pump chamber and of the hopper and transfer assemblies be accessible for cleaning.

OBJECTS AND SUMMARY OF THE INVENTION

It is an object of the present invention to provide a quick clean-up material handling device including a hopper assembly that can be quickly and easily moved between a use position overlying the material handling device, and a cleaning position exposing the interior of the hopper and of the material handling device for cleaning.

It is another object of the present invention to provide a material handling device including a transfer assembly that is easily broken down and moved to a cleaning position spaced from both the hopper assembly and the material handling device.

In accordance with these and other objects evident from the following description of a preferred embodiment, a material pump apparatus includes a frame, a pump assembly supported on the frame and including a chamber for receiving material to be handled, and a means for pumping the material from the chamber. A hopper assembly is supported on the frame for pivotal movement between a use position and a cleaning position. In the use position, the hopper assembly stores material that is to be delivered to the chamber. An actuating means is provided for pivoting the hopper assembly about a horizontal axis between the use and cleaning positions.

A transfer assembly is supported on the frame between the hopper assembly and the pump chamber for directing material from the hopper assembly into the chamber. The transfer assembly is supported for axial movement relative to the frame along a vertical axis and for pivotal movement about the vertical axis. The apparatus also includes a shifting means for shifting the transfer assembly upward along the vertical axis so that the transfer assembly may be pivoted to a cleaning position exposing the transfer assembly and the chamber of the pump assembly for cleaning.

By providing a clean-up arrangement in accordance with the present invention, several advantages are realized. For example, by providing a hopper assembly and a transfer assembly which are supported for independent swinging movement between use and cleaning positions, the assemblies and the pump chamber of the material handling apparatus are exposed for cleaning or repair.

In addition, by supporting the hopper and transfer assemblies on the frame of the apparatus, the assemblies are easily moved back and forth between the use and cleaning positions, and may be quickly refitted on the apparatus following a cleaning operation.

BRIEF DESCRIPTION OF THE DRAWING FIGURES

The preferred embodiment of the present invention is described in detail below with reference to the attached drawing figures, wherein.

DETAILED DESCRIPTION OF THE PREFERRED EMBODIMENT

Figure 1:
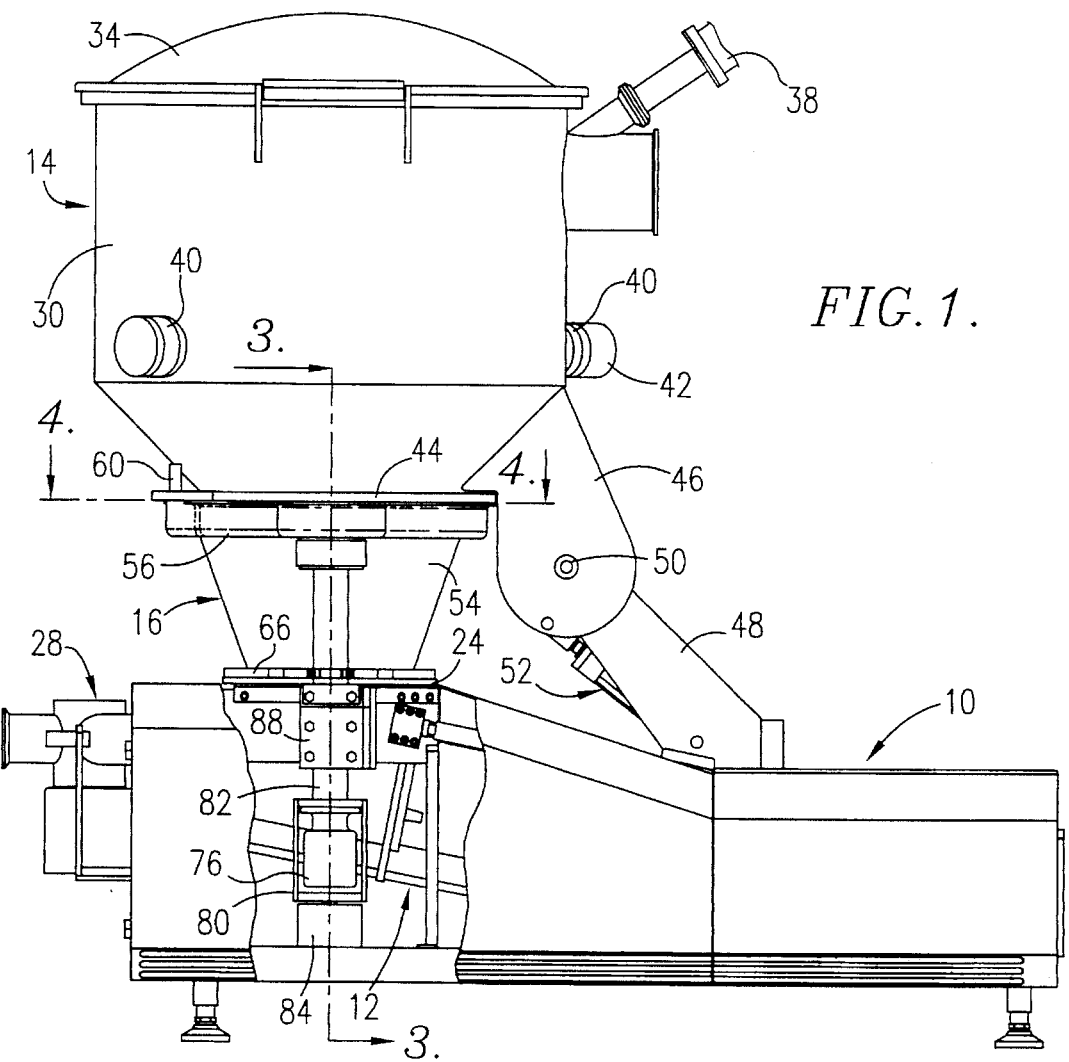
FIG. 1 is a side elevational view, partially broken away, of a dual piston pump apparatus constructed in accordance with the preferred embodiment.

A dual piston pump apparatus constructed in accordance with the preferred embodiment is shown in FIG. 1. The apparatus generally includes a frame 10 housing a dual piston pump 12, a hopper assembly 14 supported on the frame over the dual piston pump, and a transfer assembly 16 provided between the hopper and the pump.

Figure 3:
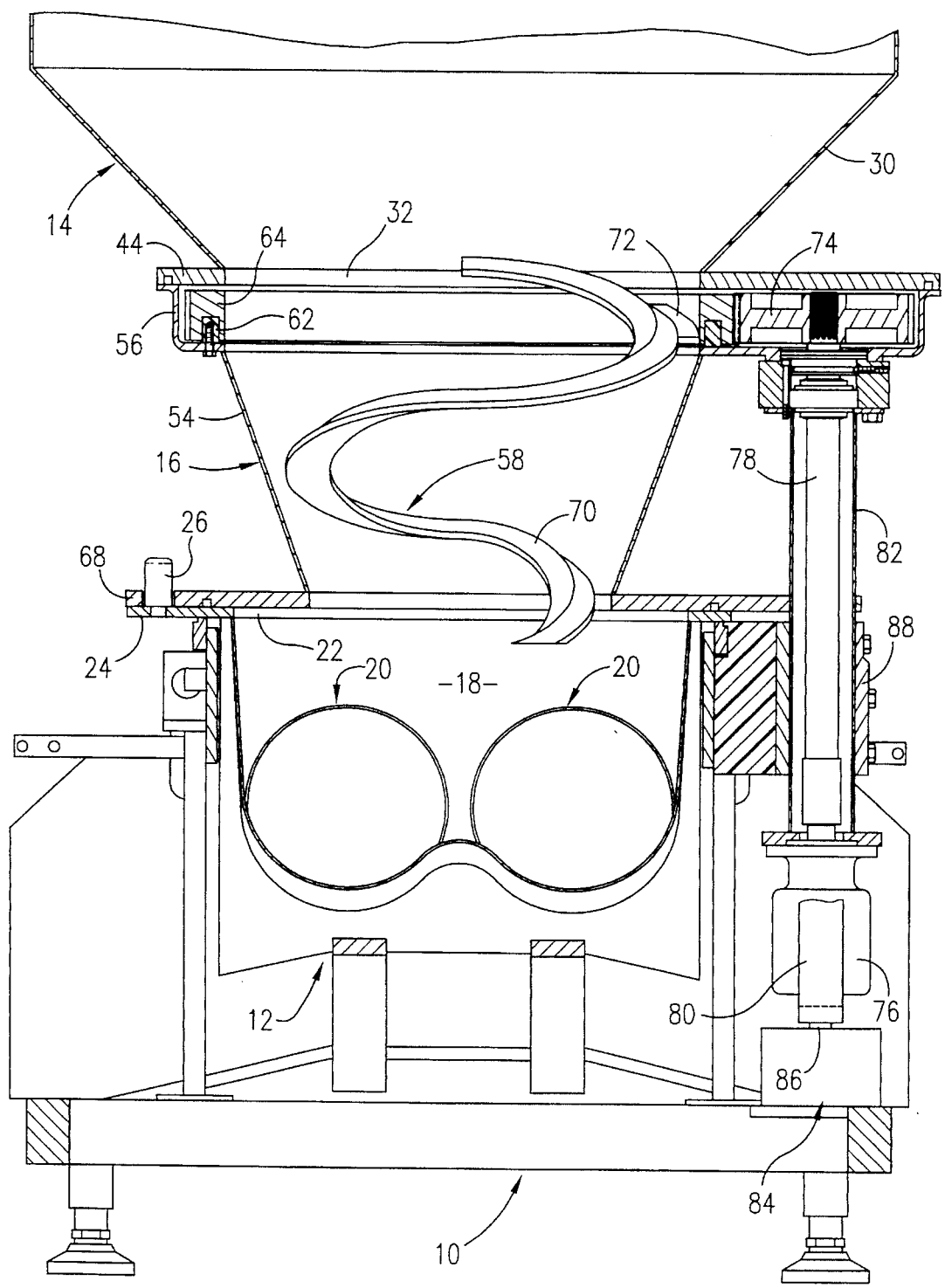
FIG. 3 is a sectional view taken along line 3—3 of FIG. 1.

The frame 10 is shown in FIG. 3, and defines a pump inlet chamber 18 that is in fluid communication with a pair of side-by-side piston pump assemblies 20. The chamber opens upward through an opening 22 in a top plate 24 of the frame for allowing a comestible product such as meat or vegetables to be fed to the chamber. The top plate 24 also includes an upstanding pin 26 adapted to locate the transfer assembly over the chamber during operation of the dual piston pump.

The dual piston pump mechanism is preferably of the type illustrated in U.S. Pat. No. 4,869,653, and includes the side-by-side pump assemblies 20, a mechanism for reciprocating the assemblies through the chamber to pump discrete charges of product from the apparatus, and an outlet valve assembly 28 for directing the product pumped from each pump assembly to a single outlet opening. However, the present invention is not limited to use on this particular device, and may be employed with other material handling equipment.

The hopper assembly 14 is illustrated in FIG. 1, and includes a large cylindrical vacuumizer housing 30 having an open top, and a tapered lower end narrowing to a discharge opening 32 at the bottom of the housing, as shown in FIG. 3. The housing is hollow, and is adapted to receive and store the comestible product that is to be subsequently handled by the pump. As shown in FIG. 1, a lid 34 is supported over the open top of the housing, and is pivotal between a closed, sealed position and an open position exposing the interior of the housing.

An inlet 36 is formed in the housing adjacent the upper end thereof, and is adapted to receive product from a supply source. The inlet includes a closure valve for closing off the inlet when desired, and a cylinder assembly 38 is provided for actuating the valve. A mixer shaft extends across the interior of the housing and is supported for rotation by a pair of bearing assemblies 40 protruding from the housing. A hydraulic motor 42 or the like is mounted on the housing, and is operable to rotate the mixer shaft during use. The mixer shaft is provided with a plurality of paddles or vanes that rotate with the shaft to mix the product within the housing.

As shown in FIG. 3, a radially outward extending flange 44 is formed around the discharge opening in the housing, and defines a bearing surface by which the hopper assembly is supported on the transfer assembly. A slot extends inward from the circumferential edge of the flange, and defines an element of a locating means for locating the hopper assembly on the transfer assembly when the hopper assembly is in the position shown in FIG. 1.

A pair of similarly shaped, laterally spaced ears 46 are attached to the tapered section of the housing and extend downward and slightly outward from the housing. These ears include a pair of aligned, horizontally extending holes that define a pivot axis about which the hopper assembly may be pivoted.

The frame 10 includes an upstanding support 48 having an upper end received between the ears of the hopper assembly. The support includes a horizontally extending hole through which a pin 50 is received for retaining the hopper assembly on the support for pivotal movement.

Figure 2:
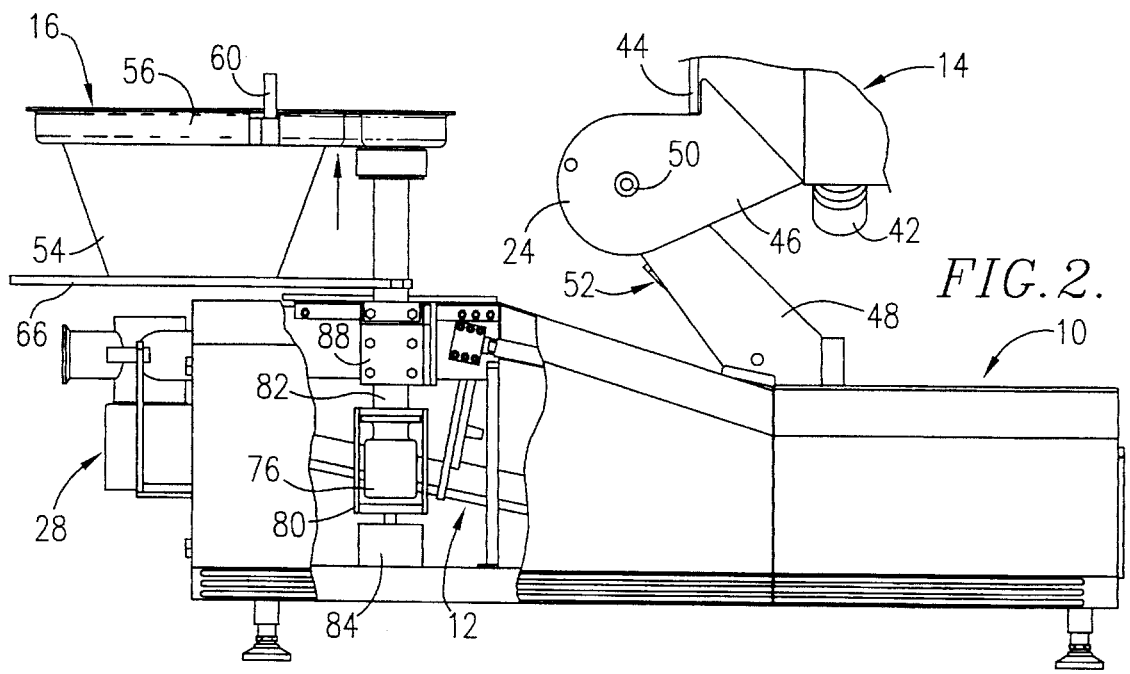
FIG. 2 is a fragmentary side elevational view similar to FIG. 1, illustrating a hopper assembly and a transfer assembly of the apparatus in a cleaning position.

An actuating means 52 is connected between the frame and the ears of the hopper assembly for pivoting the hopper assembly between a use position, as shown in FIG. 1, and a cleaning position shown in FIG. 2. The actuating means preferably includes a fluid actuated cylinder assembly having a range of motion sufficient to pivot the hopper assembly through a 90° range of movement.

The transfer assembly 16 is illustrated in FIG. 3, and includes a hollow tapered housing 54 having an open upper end of a size corresponding to the discharge opening 32 of the hopper assembly, and an open lower end in fluid communication with the inlet chamber 18 of the pump. A gear pan 56 is formed around the open upper end of the transfer assembly, and is shaped to receive an auger assembly 58 and a drive means for driving the auger assembly to move material through the transfer housing into the inlet chamber of the pump. The pan 56 also supports an upstanding pin 60 forming a part of the hopper assembly locating means, and adapted to engage the slot on the flange of the hopper assembly to locate the hopper assembly during use. In addition, an annular guide rail 62 is fastened to the bottom of the gear pan around the upper open end of the housing, and is adapted to receive a ring gear 64 that forms a part of the auger assembly 58.

Figure 4:
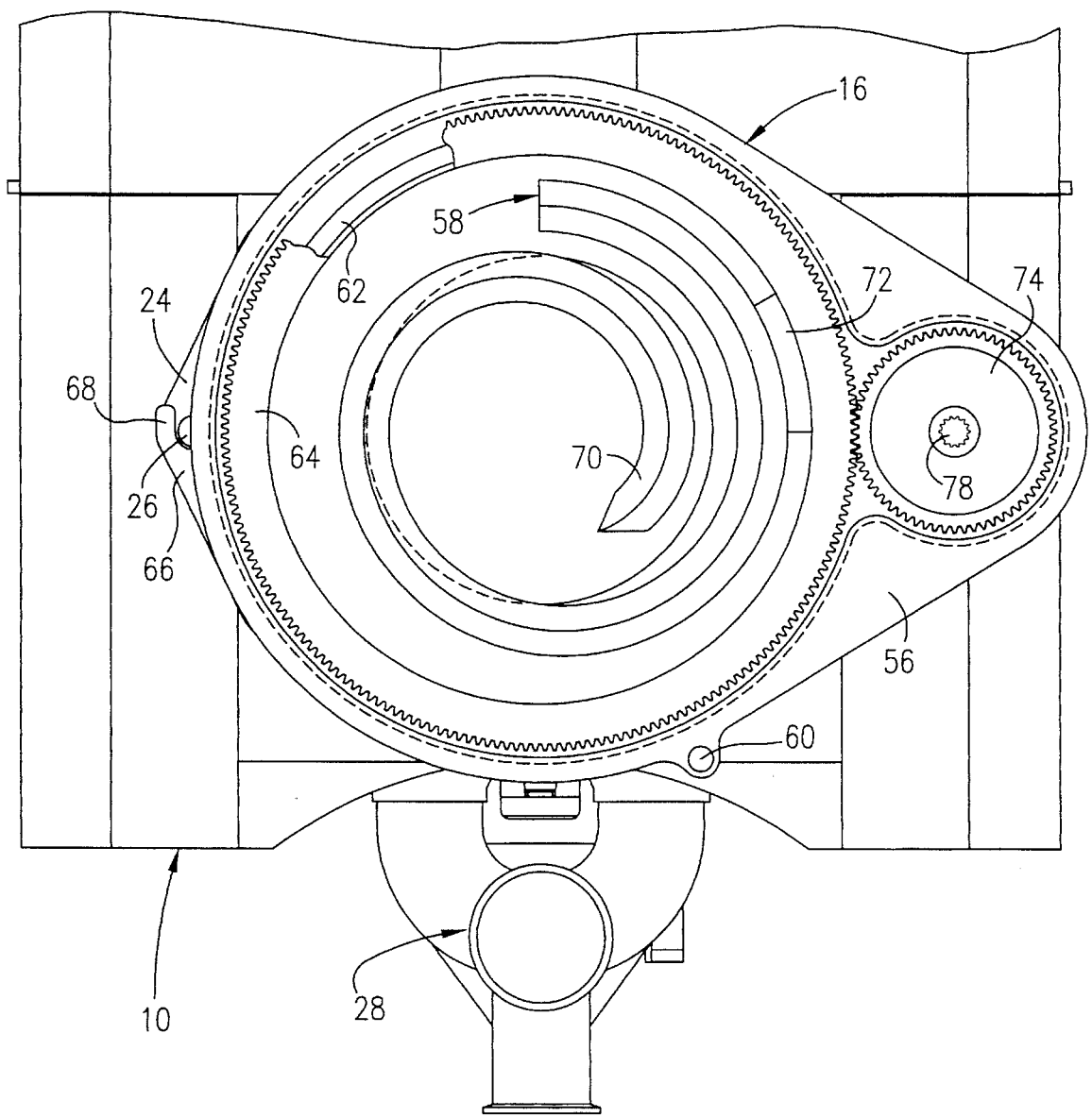
FIG. 4 is a sectional view taken along line 4—4 of FIG. 1.

The transfer assembly 16 includes a lower flange 66 extending radially outward from and circumferentially of the lower open end of the housing. The flange includes a radially protruding, circumferentially extending finger 68, shown in FIG. 4, that defines a slot of a locating means for locating the transfer assembly on the frame when the transfer assembly is in the position shown in FIG. 3. The locating means also includes the pin 26 supported on the frame, and permits vertical movement of the transfer assembly as well as pivotal movement of the assembly in one direction. However, the pin-and-slot connection restricts all other horizontal movement of the transfer assembly relative to the housing.

The auger assembly 58 is also shown in FIG. 3, and includes a spiral auger 70 having an upper end protruding above the transfer assembly into the discharge opening of the hopper assembly, and a lower end protruding through the open lower end of the transfer assembly into the inlet chamber of the pump. The auger 70 is secured to the ring gear 64 by a radially extending plate 72 welded between the auger and gear. Thus, as the ring gear is rotated in the counterclockwise direction, when viewed in FIG. 4, the auger rotates to force material from the hopper assembly through the transfer assembly and into the pump inlet chamber. The auger assembly is supported in the gear pan and is guided for movement by the annular guide rail 62.

As shown in FIG. 3, the auger drive means includes the ring gear 64 of the auger assembly, a pinion 74 supported in the gear pan in engagement with the ring gear, and a motor 76 having an output shaft 78 connected to the pinion by a splined shaft connection. The motor 76 is supported on a carriage 80 that is suspended beneath the gear pan by a sleeve 82. The motor 76 is fixed to the carriage, which in turn moves with the sleeve and gear pan when the transfer assembly is shifted relative to the frame.

The lower end of the carriage 80 is supported on a shifting means 84 for shifting the transfer assembly upward along the vertical axis defined by the shaft. The shifting means preferably includes a fluid actuated cylinder assembly including a rod 86 connected to the carriage. When the cylinder assembly is actuated, the rod lifts the entire transfer assembly 16 relative to the frame. Thus, the weight of the transfer assembly is carried by the output shaft 78 and the sleeve 82 so that it is possible to lift the transfer assembly from the frame for cleaning.

The sleeve 82 is supported on the frame by an aluminum block 88 or the like which accommodates the vertical sliding movement of the sleeve while maintaining the upright orientation of the sleeve and transfer assembly relative to the frame. In addition, the block permits the sleeve to rotate relative to the frame so that it is possible to pivot the transfer assembly away from the use position illustrated in FIG. 1, to a cleaning position illustrated in FIG. 2. During this pivotal movement, the housing, gear pan, sleeve, carriage and motor all move together relative to the frame, and the weight of the assembly is supported by the cylinder assembly.

After completion of a material handling operation, when it is desired to clean the apparatus, the processor operates the cylinder assembly 52 to pivot the hopper assembly 14 about the axis from the use position, shown in FIG. 1, to the cleaning position illustrated in FIG. 2. When the hopper assembly is disposed in the cleaning position, the lid 34 may be opened, exposing the entire interior of the housing for cleaning.

Once the hopper assembly has been pivoted away from the transfer assembly 16, the processor lifts the auger assembly 58 from the gear pan 56, and operates the cylinder assembly 84 to lift the transfer assembly from the frame, as shown in FIG. 2. Thereafter, the transfer assembly may be pivoted about the axis defined by the drive shaft to the cleaning position, also shown in FIG. 2. When in this position, the interior of the transfer assembly is accessible for cleaning. At the same time, the inlet chamber of the pump is also exposed through the opening in the top of the frame, and may be cleaned as well.

Once the cleaning operation is complete, the transfer assembly may be pivoted back over the inlet chamber and lowered onto the frame. The auger assembly may then be replaced in the pan of the transfer assembly, and the hopper assembly lowered back to the use position. The pin-and-slot connection between the frame and transfer assembly, and the pin-and-slot connection between the transfer and hopper assemblies position the assemblies relative to one another when moved to the use positions, and prevent them from being shifted out of these positions, except for cleaning.

Although the present invention has been described with reference to the preferred embodiment illustrated in the attached drawing figures, it is noted that substitutions may be made and equivalents employed herein without departing from the scope of the invention as recited in the claims.

What is claimed is:

1. In a material handling apparatus including a frame, a chamber defined by walls presenting an inlet and an outlet and supported on the frame for receiving material to be handled, and a means for moving the material through the chamber, the improvement comprising:

a hopper assembly for storing material that is to be delivered to the chamber inlet, the hopper assembly presenting walls defining a top, sidewalls and a lower outlet and being supported on the frame for pivotal movement between a use position and a cleaning position;

an actuating means for pivoting the hopper assembly between the use and cleaning positions; and a transfer assembly between the hopper assembly and the frame for directing material from the hopper assembly into the chamber through said chamber inlet, the transfer assembly including walls defining an inlet for receiving material from said hopper outlet and an outlet for delivering material to said chamber inlet, said transfer assembly being supported for pivotal movement relative to the frame between the use position and the cleaning position, wherein movement of the hopper and transfer assemblies to the cleaning positions exposes the chamber for cleaning, said transfer assembly being supported for axial movement relative to the frame along a vertical axis and for pivotal movement relative to the frame about the vertical axis the improvement further comprising a shifting means for shifting the transfer assembly upward along the vertical axis from the use position so that the transfer assembly may be pivoted to the cleaning position exposing the transfer assembly and the chamber for cleaning.

2. In an apparatus as recited in claim 1, the actuating means including fluid actuated cylinder assembly connected between the hopper assembly and the frame for carrying out the pivotal movement of the hopper assembly between the use and cleaning positions.

3. In an apparatus as recited in claim 1, the improvement further comprising a hopper assembly locating means for locating the hopper assembly on the transfer assembly when the hopper and transfer assemblies are in the use positions, the locating means including a slot-and-pin connection between the hopper and transfer assemblies which permits pivotal movement of the hopper assembly while restricting relative horizontal movement.

4. In an apparatus as recited in claim 1, the shifting means including a fluid actuated cylinder assembly.

5. In an apparatus as recited in claim 1, the transfer assembly including an auger for moving material through the transfer assembly into the chamber, and a drive means for rotating the auger, the drive means including a first gear on which the auger is supported, a second gear for driving the first gear, and a motor for driving the second gear, the auger and first gear being removable from the transfer assembly to permit cleaning of the apparatus.

6. In an apparatus as recited in claim 5, the second gear and motor being supported on the transfer assembly during movement of the transfer assembly between the use and cleaning positions.

7. In an apparatus as recited in claim 1, the improvement further comprising a transfer assembly locating means for locating the transfer assembly on the frame when the transfer assembly is in the use position, the locating means including a slot-and-pin connection between the transfer assembly and the frame which permits vertical movement of the transfer assembly while restricting relative horizontal movement in all but one horizontal directions.

8. A material pump apparatus comprising:

a frame;

a pump assembly supported on the frame and including a chamber presenting walls defining a chamber inlet and a chamber outlet for receiving material to be handled, and a means for pumping the material from the chamber;

a hopper assembly for storing material that is to be delivered to the chamber, the hopper assembly presenting walls defining a top, sidewalls and a lower outlet opening and being supported on the frame for pivotal movement about a horizontal axis between a use position and a cleaning position;

an actuating means for pivoting the hopper assembly between the use and cleaning positions;

a transfer assembly between the hopper assembly and the frame for directing material from the hopper assembly into the pump chamber, the transfer assembly including walls defining an inlet for receiving material from said hopper outlet and an outlet for delivering material to said chamber inlet, said transfer assembly being supported for axial movement relative to the frame along a vertical axis and for pivotal movement relative to the frame about the vertical axis; and a shifting means for shifting the transfer assembly upward along the vertical axis so that the transfer assembly may be pivoted to the cleaning position exposing the transfer assembly and the chamber of the pump assembly for cleaning.

9. In a material handling apparatus including a frame, a chamber defined by walls presenting an inlet and an outlet and supported on the frame for receiving material to be handled, and a means for moving the material through the chamber, the improvement comprising:

a hopper assembly for storing material that is to be delivered to the chamber inlet, the hopper assembly presenting walls defining a top, sidewalls and a lower outlet and being supported on the frame for pivotal movement between a use position and a cleaning position;

an actuating means for pivoting the hopper assembly about a first pivot axis between the use and cleaning positions; and a transfer assembly between the hopper assembly and the frame for directing material from the hopper assembly into the chamber through said chamber inlet, the transfer assembly including walls defining an inlet for receiving material from said hopper outlet and an outlet for delivering material to said chamber inlet, said transfer assembly being supported for pivotal movement relative to the frame about a second pivot axis between the use position and the cleaning position, wherein movement of the hopper and transfer assemblies to the cleaning positions exposes the chamber for cleaning, said first and second pivot axes being transverse relative to each other.

10. In an apparatus as recited in claim 9, said first pivot axis being generally horizontal, said second pivot axis being upright.

11. In an apparatus as recited in claim 10, said transfer assembly being movable axially along the length of said second pivot axis and then pivotal about the second pivot axis.

* * * * *